United States Patent [19]

Griesser

[11] 4,425,990
[45] Jan. 17, 1984

[54] CLUTCH ASSEMBLY FOR GEAR TRANSMISSION

[75] Inventor: Walter Griesser, Friedrichshafen, Fed. Rep. of Germany

[73] Assignee: Zahnradfabrik Friedrichshafen Aktiengesellschaft, Friedrichshafen, Fed. Rep. of Germany

[21] Appl. No.: 312,129

[22] Filed: Oct. 16, 1981

Related U.S. Application Data

[63] Continuation-in-part of Ser. No. 141,150, Apr. 17, 1980, Pat. No. 4,349,090.

[30] Foreign Application Priority Data

Apr. 20, 1979 [DE] Fed. Rep. of Germany ....... 2915965
Oct. 17, 1980 [DE] Fed. Rep. of Germany ....... 3039231

[51] Int. Cl.$^3$ .............................................. F16D 23/06
[52] U.S. Cl. .................................. 192/53 G; 74/339; 192/53 F
[58] Field of Search .............. 192/53 F, 53 G; 74/339

[56] References Cited

U.S. PATENT DOCUMENTS 2,941,641 6/1960 Stump ............................. 192/53 F

FOREIGN PATENT DOCUMENTS 1095133 12/1960 Fed. Rep. of Germany .... 192/53 F
3039231 4/1982 Fed. Rep. of Germany .
2048399 12/1980 United Kingdom .

*Primary Examiner*—Allan D. Herrmann
*Attorney, Agent, or Firm*—Karl F. Ross

[57] ABSTRACT

A driving gear having external teeth in mesh with internal teeth of a sliding sleeve carries several peripherally spaced spring-loaded detent members which are pivotable in respective axial planes and extend radially into an inner peripheral groove of the sleeve in a decoupling position of the latter, the sleeve being able to engage a driven gear coaxial with the driving gear only upon radially depressing these members against their spring force. A synchro ring coaxial with the two gears is limitedly rotatable relatively to the driving gear and has a clutch surface confronting a similar surface of the driven gear through a narrow clearance which closes when the ring, under an axial thrust from the detent members, is moved toward the driven gear by an incipient coupling shift of the sleeve. The synchro ring has a plurality of peripherally separated projections which spacedly bracket the detent members and cammingly coact with their stems to transmit the aforementioned axial thrust while preventing a depression of these members by the sleeve, and thus a full shifting of the latter into meshing engagement with the driven gear, in a position of angular disalignment due to a speed difference between the driven gear and the ring.

10 Claims, 6 Drawing Figures

CLUTCH ASSEMBLY FOR GEAR TRANSMISSION

CROSS-REFERENCE TO RELATED APPLICATION

This is a continuation-in-part of my copending application Ser. No. 141,150 filed Apr. 17, 1980 now U.S. Pat. No. 4,349,090.

FIELD OF THE INVENTION

My present invention relates to a clutch assembly for an automotive or other transmission system in which a pair of coaxial gears, one of them driven, can be positively interconnected for joint rotation by an internally toothed sleeve meshing only with one gear in a decoupling position but engaging the teeth of both gears in a coupling position into which it is slidable after the two gears have been synchronized, i.e. are rotating at the same speed (which in certain cases could even be zero).

BACKGROUND OF THE INVENTION

The use of such a sliding sleeve is well known in constant-mesh gear transmissions of the synchromesh type, e.g. as described in "Principles of Automotive Vehicles", Manual TM9-8000 and TO36A-1-76, published January 1956 by the Department of the Army and the Air Force, pages 284–288. In the system described in that publication, the sleeve is in permanent mesh with a sliding gear splined to a main shaft and is releasably connected therewith for limited joint axial motion by a set of spring-loaded ball checks. The sliding gear and the coaxial gear to be driven thereby are provided with confronting frustoconical clutch surfaces which are separated by a small clearance in a decoupling position but contact each other when the first gear and its sleeve are axially moved toward a coupling position. The second gear is then frictionally entrained and accelerated (or possibly decelerated) until its speed substantially equals that of the first gear. Only then can the teeth of the sleeve enter between the teeth of the second gear, the two sets of teeth being suitably beveled at their confronting ends to facilitate the meshing engagement.

In lieu of a sliding gear it is also possible to use in such a system an axially fixed driving gear together with a so-called synchro ring coaxially interposed between the two gears, the synchro ring rotating with the driving gear but being axially entrainable by the sleeve through ball checks or the like to establish frictional contact between a clutch surface on that ring and a confronting clutch surface on the driven gear. Upon the establishment of such contact, the sleeve is released from the synchro ring and can be axially slid into engagement with the driven gear.

The completion of the shift of the sleeve into a coupling position, however, is not always smooth with either type of system and, when carried out too rapidly, could still give rise to annoying gear clashing.

The synchromesh-type gear transmission described in my copending application Ser. No. 141,150, now U.S. Pat. No. 4,390,090, effectively prevents by simple means any attempted meshing between the sleeve in permanent mesh with a first gear and a second gear to be coupled thereto until and unless the relative slip of the gears has been eliminated. For this purpose the first gear (usually the driving one) is provided with detent means in the form of several—preferably three—peripherally equispaced rocker members having feet pivotally received in the body of that gear and heads extending substantially radially under outwardly acting spring pressure into an inner peripheral recess of the sleeve in the decoupling position of the latter in which the teeth of the sleeve are not engaged with those of the second (e.g. the driven) gear. Upon an incipient axial shift of the sleeve toward that second gear, the stem of each rocker member exerts an axial thrust upon a synchro ring which is coaxially interposed between the two gears with freedom of limited rotation relative to the first gear. This axial thrust establishes frictional contact between coacting clutch surfaces of the synchro ring and the second gear whereby that ring is entrained into or maintained in a position of rotational disalignment relative to the first gear as long as a significant speed difference or slip exists between the two gears. In that disalignment position each rocker member comes to rest against one of two webs on the synchro ring by which it is bracketed, the webs and the rocker members being provided with flat camming surfaces which prevent a radial inward displacement of the rocker members until the speed difference between the two gears and thus the frictional torque resisting the depression of these members have been sufficiently reduced to enable the rotation of the synchro ring into a position of relative alignment. It is only then that the sleeve can complete the axial shift in order to establish a coupling position in which its teeth also mesh with those of the second gear. The pivotal motion of the rocker members acting as detents translates the sliding force exerted upon the sleeve into an intensified axial thrust acting on the synchro ring.

The relatively large contact area between the flat sloping camming surfaces of the detent members and the webs of the synchro ring generates considerable friction which must be overcome to establish the rotational alignment enabling a shifting of the sleeve into its coupling position. There is also additional friction between each detent member and another surface of the synchro ring which receives the axial thrust exerted by that member.

OBJECT OF THE INVENTION

The object of my present invention, therefore, is to provide an improved gear transmission of the aforedescribed type in which the frictional resistance encountered after the establishment of substantial synchronism is minimized.

SUMMARY OF THE INVENTION

I realize this object, in accordance with my present invention, by providing the synchro ring with a plurality of peripherally spaced-apart projections or bosses extending axially into cutouts of the first gear, these projections having curved camming areas spacedly bracketing associated detent members disposed in these cutouts. In the disalignment position referred to, each detent member is in virtual point contact with the camming area of one of the bracketing projections through which it also exerts at least part of the requisite axial thrust upon the synchro ring during the incipient shift of the sleeve. That axial thrust may be supplemented by pressure members which are angularly interleaved with the detent members at locations that are more widely separated than any of the latter members from the nearest projection of the synchro ring so that the pressure members do not coact with any such projection even in a disalignment position; in contrast to the detent members, the similarly spring-loaded and preferably also pivotable pressure members do not significantly resist the axial shifting of the sleeve in any relative rotary position of the first gear and the synchro ring.

Advantageously, the projections or bosses of the synchro ring have peripheral surfaces which are figures of revolutions such as frustocones or parts of one-sheet hyperboloids. The stems of the detent members may have radially outwardly diverging flanks which are either flat or concave and which coact with these peripheral surfaces.

BRIEF DESCRIPTION OF THE DRAWING

The above and other features of my invention will now be described in detail with reference to the accompanying drawing in which.

SPECIFIC DESCRIPTION

Figure 1:
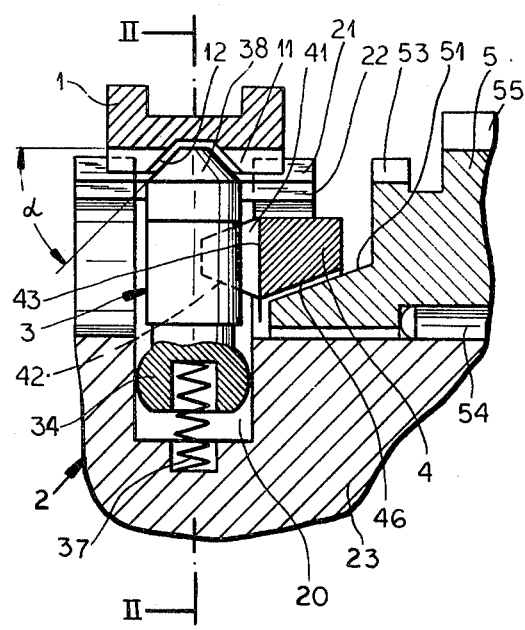
FIG. 1 is a longitudinal sectional view, in the radial direction, of one half of a clutch assembly embodying my invention.
Figure 2:
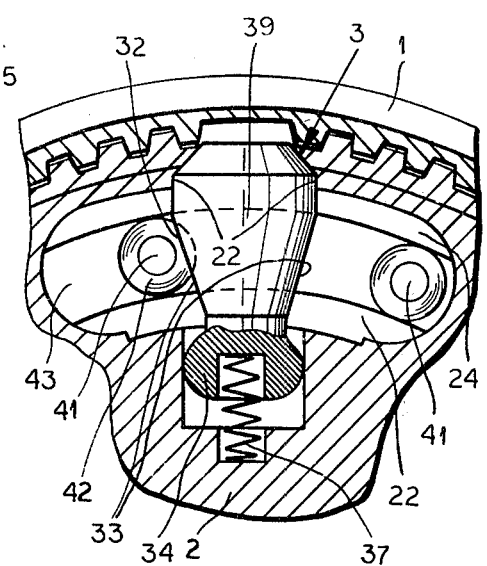
FIG. 2 is a fragmentary cross-sectional view taken on the line II—II of FIG. 1.

In FIGS. 1 and 2 I have shown a clutch assembly comprising a driving gear 2 of an automotive transmission having a toothed flange in mesh with a pinion on an engine-powered input shaft as illustrated in my copending application Ser. No. 141,150. Gear 2 is integral with or otherwise secured to a shaft 23 on which a driven gear 5 is rotatably but nonshiftably supported by bearing rollers 54. The body of gear 2 carries another set of teeth 21 in permanent mesh with internal teeth 11 of a sliding sleeve 1 which has an outer peripheral groove 12 engaged by the usual shift fork (not shown). Driven gear 5 has a set of teeth 55 of the same diameter and pitch as teeth 21 and can thus be positively coupled with driving gear 2 when the sleeve 1 is slid from its illustrated decoupling position to the right (as viewed in FIG. 1) into a coupling position.

Driving gear 2 is provided in the region of its teeth 21 with a plurality of peripherally equispaced pits 20 and cutouts 24, e.g. three (only one shown), each pivotally accommodating a spheroidally convex foot 34 of a detent member 3 urged radially outward by a compression spring 27. Each detent member is free to rock in an axial plane of gears 2 and 5 but is laterally restrained by cheeks 22 of the body of gear 2 flanking the respective cutout 24; gear teeth 21 are interrupted in the area of that cutout. Member 3 is a peg having an enlarged rectangular head, engaged by the cheeks 22, with camming edges 38 substantially paralleling two beveled boundaries of a trapezoidally profiled inner peripheral groove 12 of sleeve 1 into which this head projects in the illustrated decoupling position; the camming angle α is about 45°.

A synchro ring 4 floatingly and coaxially interposed between gears 2 and 5 has several pairs of projections or bosses 41 extending in axial direction from an annular face 43 thereof into the respective cutouts 24 of gear 2, the bosses 41 having frustoconical peripheral surfaces 42 spacedly bracketing the respective detent member 3 whose stem in this embodiment has a pair of radially outwardly diverging lateral faces 33 confronting these surfaces. In an alignment position, in which the detent member 3 is substantially centered between its bracketing bosses 41, that member can be depressed against the force of its loading spring 37 by the camming action of groove 12 and edges 38 upon a shifting of the sleeve 1 into its coupling position. Such depression, however, is prevented by a virtually punctiform contact between one of the flanks 33 of stem 39 and the periphery 42 of an adjoining boss 41 when, as seen in FIG. 2, the synchro ring 4 is rotationally disaligned from the gear 2 upon being frictionally entrained by the gear 5 through a pair of frustoconical contact surfaces 46, 51 thereof whose generatrices are inclined to the axis at an angle somewhat smaller than the camming angle α. As long as the two gears 2 and 5 rotate at different speeds (with one of them possibly standing still), and while an axial thrust in the coupling direction is exerted upon the ring 4 by the sleeve 1 through the intermediary of the rocking detent members 3 and the engaged bosses 41, the ring 4 will be held in that disalignment position by a frictional torque resisting any rotation of the ring relative to gear 2 in a sense opposite the direction of slip of gear 5 which in FIG. 2 is assumed to be clockwise. This blocks any rightward shift (as viewed in FIG. 1) of the sleeve 1 beyond the point at which contact is made between the clutch surfaces 46 and 51. When that contact has substantially equalized the rotary speeds of the two gears, the frictional torque opposing the radial inward motion of members 3 virtually disappears so that the gears can be positively coupled to each other.

Figure 3:
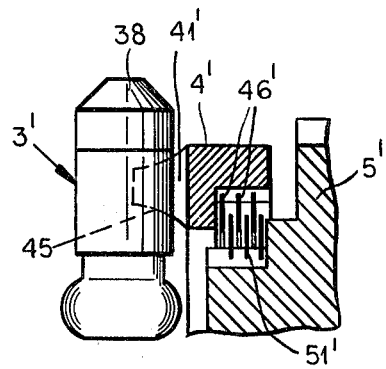
FIG. 3 is a detail view, in longitudinal section, of a modified clutch assembly representing another embodiment.
Figure 4:
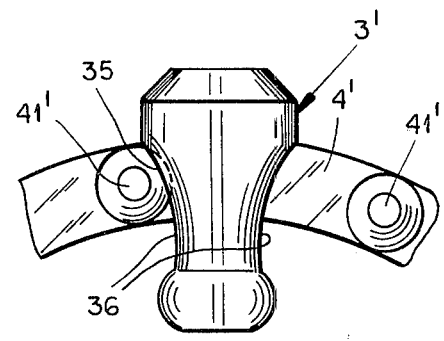
FIG. 4 is a detail view, in axial direction, showing a further modification.

As shown in FIGS. 3 and 4, the frustoconical projections 41 of synchro ring 4 may be replaced by bosses 41' of a modified synchro ring 4' which may have concave generatrices 45 preferably defining part of a one-sheet hyperboloid. These Figures also show a modified detent member 3' whose stem has concave flanks 36 replacing the flat faces 33 of the preceding embodiment. The detents of FIGS. 3 and 4 could, however, also coact with the projections of FIGS. 1 and 2 or vice versa. In any event, a virtual point contact exists between the peripheral surface of a synchro-ring projection and a flank of a detent member in contact therewith as indicated at 32 in FIG. 2 and at 35 in FIG. 4.

The modified synchro ring 4' of FIG. 3 is shown to confront a gear 5' which, like that ring, supports a set of annular friction disks forming the synchronizing clutch surfaces, the disks 46' of ring 4' being interleaved with the disks 51' of gear 5' in the manner of conventional multi-plate clutches. Such a coupling could, of course, also be used in the embodiment of FIGS. 1 and 2 in lieu of the frustoconical surfaces 46 and 51 of ring 4 and gear 5.

Figure 5:
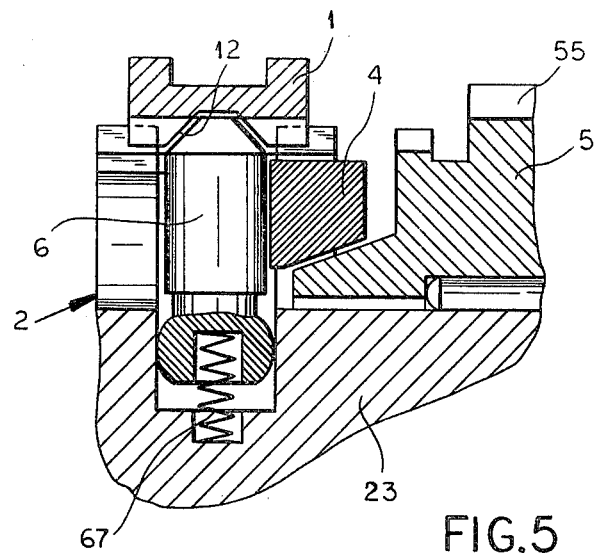
FIG. 5 is another longitudinal sectional view of the embodiment of FIGS. 1 and 2.
Figure 6:
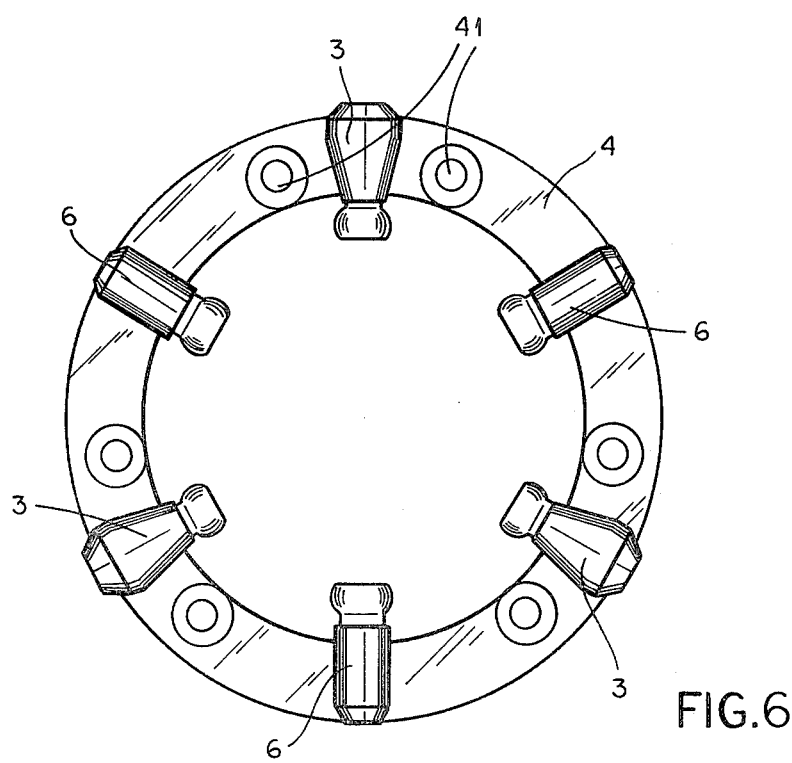
FIG. 6 is a face view of a synchro ring with associated detent members forming part of the embodiment of FIGS. 1, 2 and 5.

As shown in FIGS. 5 and 6, the several detent members 3 (or possibly 3') of gear 2 may be angularly interleaved with as many pressure members 6 of substantially the same head and foot configuration and similar pivotal mode of mounting, the heads of these pressure members being biased by associated loading springs 67 into the inner peripheral groove 12 of sleeve 1 for inward camming displacement upon an axial shift of the sleeve into its coupling position. As seen in FIG. 6, the gear 2 is provided with three equispaced detent members 3, bracketed by respective pairs of bosses 41, and with as many pressure members 6 which, however, are out of contact with bosses 41 in any relative ring position of ring 4 and the gear 2 supporting these members. As will be apparent from FIG. 5, pressure members 6 hae cylindrical stems which closely adjoin the face 43 (FIG. 1) of synchro ring 4 and may even be in contact therewith while the sleeve 1 is in its decoupling position; thus, their presence avoids the need for any direct contact between the detent members 3 and the ring 10 except through the projections 41. Springs 67 are relatively weak so as not materially to impede the shift of sleeve 1 after synchronism has been achieved.

When the gear 2 is designed as a stationary component, the assembly shown in the drawing will serve as a stop for the gear 5 but its mode of operation will be basically unchanged.

I claim:

1. In a gear transmission having a first gear, a second gear coaxial with said first gear, said gears being provided with respective sets of teeth of like pitch and diameter, and an internally toothed sleeve meshing only with the teeth of said first gear in a decoupling position, said sleeve being axially slidable into a coupling position in which it meshes with the teeth of said first and second gears for positively connecting same to each other, the combination therewith of a synchro ring coaxially interposed between said gears with freedom of limited rotation relative to said first gear, said synchro ring carrying peripherally spaced-apart projections extending generally axially into cutouts of said first gear, said synchro ring and said second gear being provided with confronting clutch surfaces separated by an annular clearance from each other in the decoupling position of said sleeve, a spring-loaded detent member in each of said cutouts with a stem spacedly bracketed by curved camming areas of two of said projections and with a head extending substantially radially into an inner peripheral recess of said sleeve in said decoupling position, said head and said recess having camming formations for urging said detent member radially inward against the spring force acting thereon upon an axial shift of said sleeve, said synchro ring enabling disengagement of said head from said sleeve in a position of relative rotational alignment of said gears to permit completion of an incipient axial shift of said sleeve toward said second gear, said stem being in virtual point contact with the camming area of one of the bracketing projections in a position of rotational disalignment of said synchro ring relative to said first gear to resist disengagement of said head from said sleeve and thereby to prevent a complete shift of said sleeve into said coupling position, such disalignment resulting from a speed difference between said first and second gears upon the establishment of frictional contact between said clutch surfaces by an axial thrust exerted upon said synchro ring by said stem through the camming area of said one of the bracketing projections, the latter being repressible by said sleeve through the intermediary of said member for establishing said relative rotational alignment upon the substantial elimination of said speed difference.

2. The combination defined in claim 1 wherein said detent member has a foot pivotally received in said first gear for rocking in an axial plane of said gears in response to said incipient axial shift, thereby amplifying the axial thrust exerted upon said synchro ring by said stem.

3. The combination defined in claim 1 or 2 wherein said projections have peripheral surfaces converging axially toward said first gear and defining said curved camming areas, said stem having radially outwardly diverging flanks confronting said peripheral surfaces.

4. The combination defined in claim 3 wherein said peripheral surfaces are of conical shape.

5. The combination defined in claim 3 wherein said peripheral surfaces are one-sheet hyperboloids.

6. The combination defined in claim 3 wherein said flanks are flat.

7. The combination defined in claim 3 wherein said flanks are concave.

8. The combination defined in claim 1 or 2 wherein said detent member is one of a plurality of substantially identical detent members angularly equispaced about the axis of said gears and bracketed by respective pairs of said projections, said first gear being further provided with spring-loaded pressure members angularly interleaved with said detent members at locations more widely separated than any of said detent members from the nearest projections of said synchro ring, said pressure members being detachably engaged by said sleeve in said decoupling position for axial entrainment jointly with said detent members toward said second gear and radially inward repression against the spring force upon completion of the shift into said coupling position, said pressure members exerting upon said synchro ring an initial axial thrust during said incipient shift.

9. The combination defined in claim 1 or 2 wherein said clutch surfaces are complementarily frustoconical.

10. The combination defined on claim 1 or 2, further comprising a plurality of axially shiftable annular friction elements interposed in the clearance between said clutch curfaces, said friction elements being alternately linked with said synchro ring and with said second gear for rotation therewith.

* * * * *